United States Patent Office 3,053,890
Patented Sept. 11, 1962

3,053,890
REACTION PRODUCTS OF FORMALDEHYDE AND
o-MERCAPTOMETHYLBENZOIC ACID
Maurice J. Schlatter, Berkeley, Calif., assignor to California Research Corporation, San Francisco, Calif., a corporation of Delaware
No Drawing. Filed Mar. 31, 1960, Ser. No. 18,832
3 Claims. (Cl. 260—516)

The present invention relates to the preparation of new compounds from the interaction of formaldehyde and o-mercaptomethylbenzoic acid, and more specifically, to compounds falling within the generic formula,

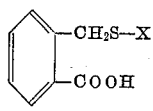

wherein X is an organic residue selected from the group consisting of the radicals —$CH_2$—OH and

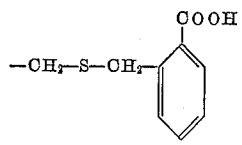

thus yielding, respectively, the hemimercaptal, hydroxymethyl o-carboxybenzyl sulfide, and the mercaptal, bis-(o-carboxybenzylmercapto) methane. These materials are useful in the preparation of polymers, as components of greases and special lubricants, chelating agents, intermediates for dyes, and pharmaceuticals.

In general, the new compounds of the invention are obtained by the interaction of o-mercaptobenzoic acid with an excess of formaldehyde, the hemimercaptal or the mercaptal being obtained depending on temperature of reaction and extent thereof. Thus, the hydroxymethyl o-carboxybenzyl sulfide can be regarded as an intermediate in the formation of the bis-(o-carboxybenzylmercapto) methane, the former being obtained at relatively low temperatures (e.g., 25° C.), while the latter is obtained at relatively high temperatures (e.g., 165° C.). Both are white solids, and are useful in the preparation of polymeric materials, the hemimercaptal being capable of undergoing homopolymerization, and the mercaptal capable of reacting with alcohols and amines to form polyesters and polyamides.

The over-all reactions involved in the preparation of the new compounds may be represented as follows:

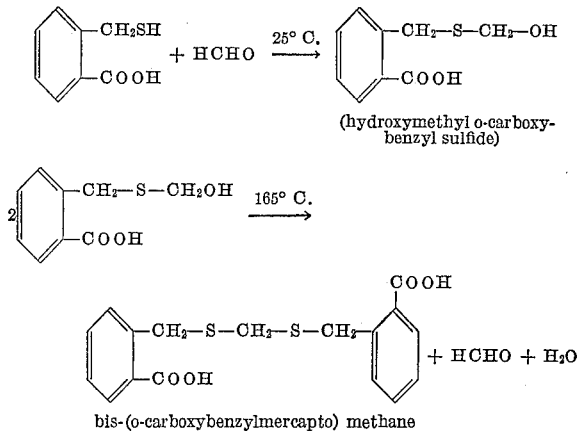

The following illustrates the preparation of the novel compounds of the invention.

EXAMPLE I

*Preparation of Hydroxymethyl o-Carboxybenzyl Sulfide*

7.38 g. formaldehyde (0.09 mol) in a water solution having a formaldehyde concentration of 36.6%, is mixed with a solution of 5.05 g. (0.03 mol) of o-mercaptomethylbenzoic acid in 60 ml. of absolute ethanol and the resulting mixture allowed to stand 17 hours at 25° C. The mixture is then concentrated on a steam plate until crystals begin to separate and allowed to cool. The crystals are collected, washed with water, and dried in vacuo. The crystals weigh 3.65 g. and have a melting point of 133.6° to 134.2° C. A second crop of crystals is obtained by diluting the mother liquors with an equal volume of water, thus yielding after drying another 1.74 g. of crystals. The total yield is approximately 85% to 90%. Analyses of the product as above are as follows:

| Analysis | Found | Calculated |
|---|---|---|
| Neutral Equivalent | 198.8 | 198.23 |
| C | 54.68; 54.58 | 54.53 |
| H | 5.08; 5.11 | 5.09 |
| S | 16.1 | 16.17 |

EXAMPLE II

*Preparation of Bis-(o-Carboxybenzylmercapto) Methane* o-Mercaptomethylbenzoic acid in an amount of 10.0 g. (0.059 mol) is readily dissolved in 20 g. of water-formaldehyde solution containing 36.6% formaldehyde (0.24 mol) at 80° C. The mixture is heated for one hour at 80° to 90° C., after which it is cooled in ice. Crystals separate (4.63 g.) and are crystallized from ethanol giving 3.41 g. of bis-(o-carboxybenzylmercapto) methane melting at 199.6° to 201.0° C., in compact rosettes of fine, colorless needles. The yield represents 33% of theory, based on o-mercaptomethylbenzoic acid charged.

The filtrate following the crystallization above is diluted with 50 ml. water to separate crude hydroxymethyl o-carboxybenzyl sulfide, which is collected at 0° C., washed with water and dried in vacuo. 5.90 g. of product is obtained, from which there is obtained additional bis-(o-carboxybenzylmercapto) methane by heating at 160° C. for 30 minutes and then crystallizing from ethanol. Over-all yield is nearly quantitative.

A sample of the product obtained in accordance with the procedure of Example I is placed in a bath at 165° C. It melts with vigorous gas evolution, and then in nine minutes crystallizes completely to a white solid having a melting point substantially like the one given above.

A composite sample of the materials prepared as above described then analyzed, gives the following results:

| Analysis | Found | Calculated |
|---|---|---|
| Neutral Equivalent | 176.1 | 174.21 |
| C | 58.65; 58.74 | 58.60 |
| H | 4.70; 4.85 | 4.63 |
| S | 18.2 | 18.40 |

EXAMPLE III

*Preparation of Hexamethylene Salt*

The hexamethylene salt of bis-(o-carboxybenzylmercapto) methane is prepared by warming on a steam bath with the theoretical amount of a 20% aqueous solution of hexamethylene diamine. The hot solution is decolorized by heating with Norite "A" and filtering while hot. The hexamethylene diamine salt separates on cooling and is purfied by recrystallizing from water.

EXAMPLE IV

*Preparation of Polymer*

Polymer is obtained by heating the salt in a suitable tube immersed in an oil bath while passing a slow stream of nitrogen through. The temperature of the bath is raised to 260° C. over a period of 30 minutes. Heating is continued at this temperature for 2 to 4 hours while gradually reducing the pressure to 1 mm. of mercury.

The resulting polymer is soluble in phenol or aromatic solvents. It is a useful component of surface coatings.

I claim:

1. Reaction products of o-mercaptobenzoic acid and formaldehyde of the general formula

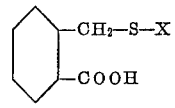

wherein X is an organic group selected from the class consisting of the radicals —$CH_2$—OH, and

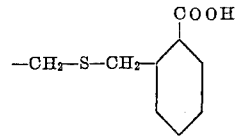

2. Bis-(-carboxybenzylmercapto) methane.
3. Hydroxymethyl o-carboxybenzyl sulfide.

References Cited in the file of this patent

UNITED STATES PATENTS 2,657,231    Klarer et al. _____ Oct. 27, 1953